US008863282B2

(12) United States Patent
Kumar et al.

(10) Patent No.: US 8,863,282 B2
(45) Date of Patent: Oct. 14, 2014

(54) DETECTING AND RESPONDING TO MALWARE USING LINK FILES

(75) Inventors: Lokesh Kumar, Tamil Nadu (IN); Harinath Vishwanath Ramchetty, Karnataka (IN); Girish R. Kulkarni, Bangalore (IN)

(73) Assignee: McAfee Inc., Santa Clara, CA (US)

( * ) Notice: Subject to any disclaimer, the term of this patent is extended or adjusted under 35 U.S.C. 154(b) by 750 days.

(21) Appl. No.: 12/579,679

(22) Filed: Oct. 15, 2009

(65) Prior Publication Data
US 2011/0093952 A1    Apr. 21, 2011

(51) Int. Cl.
*G06F 21/00* (2013.01)
*G06F 21/55* (2013.01)
*H04L 29/06* (2006.01)
*G06F 21/51* (2013.01)
*G06F 21/56* (2013.01)

(52) U.S. Cl.
CPC ............. *G06F 21/51* (2013.01); *G06F 21/554* (2013.01); *H04L 63/145* (2013.01); *G06F 21/56* (2013.01)
USPC ................. 726/23; 726/22; 726/24; 713/187; 713/188

(58) Field of Classification Search
CPC ......... G06F 21/50; G06F 21/51; G06F 21/52; G06F 21/56
USPC ...................................... 726/24, 23
See application file for complete search history.

(56) References Cited

U.S. PATENT DOCUMENTS 5,987,610  A    11/1999   Franczek et al.
6,073,142  A     6/2000   Geiger et al.
(Continued)

FOREIGN PATENT DOCUMENTS

CN      101213555 A    7/2008
JP      2003-086233 A   3/2003
(Continued)

OTHER PUBLICATIONS
Brutch et al., "A Survey of UNIX Penetration Tests Performed During a Graduate Computer Security Class at Texas A&M University", 1998, pp. 1-16.*
(Continued)

*Primary Examiner* — Mohammad L Rahman
*Assistant Examiner* — Thaddeus Plecha
(74) *Attorney, Agent, or Firm* — Patent Capital Group

(57) ABSTRACT

Methods, systems, and apparatus, including computer programs encoded on a computer storage medium, for monitoring the generation of link files by processes on a computer and performing protection processes based on whether the link files target malicious objects or are generated by malicious processes. In one aspect, a method includes monitoring for a generation of a first file that includes a target path that points to an object; in response to monitoring the generation of the first file: determining whether the target path is a uniform resource locator; in response to determining that the target path is a uniform resource locator, identifying a process that caused the first file to be generated; determining whether the process is a prohibited process; in response to determining that the process is a prohibited process, performing one or more protection processes on the process and the first file; in response to determining that the process is not a prohibited process, determining whether the uniform resource locator is a prohibited uniform resource locator; in response to determining that the uniform resource locator is a prohibited uniform resource locator, performing one or more protection processes on the process and the first file.

20 Claims, 5 Drawing Sheets

(56) References Cited

U.S. PATENT DOCUMENTS

| | | | |
|---|---|---|---|
| 6,460,050 B1 | 10/2002 | Pace et al. | |
| 7,472,420 B1 | 12/2008 | Pavlyushchik | |
| 7,506,155 B1 | 3/2009 | Stewart et al. | |
| 8,104,090 B1* | 1/2012 | Pavlyushchik | 726/24 |
| 2002/0129277 A1* | 9/2002 | Caccavale | 713/201 |
| 2002/0162013 A1* | 10/2002 | Burnett et al. | 713/200 |
| 2006/0015940 A1 | 1/2006 | Zamir et al. | |
| 2007/0016953 A1* | 1/2007 | Morris et al. | 726/24 |
| 2007/0067682 A1 | 3/2007 | Fang | |
| 2007/0240217 A1 | 10/2007 | Tuvell et al. | |
| 2008/0104699 A1 | 5/2008 | Gounares et al. | |
| 2008/0263659 A1* | 10/2008 | Alme | 726/22 |
| 2009/0138969 A1 | 5/2009 | Kim et al. | |
| 2010/0306851 A1 | 12/2010 | Zhou | |

FOREIGN PATENT DOCUMENTS

| | | |
|---|---|---|
| JP | 2007522582 | 8/2007 |
| JP | 2008047123 A | 2/2008 |
| JP | 2008518323 A | 5/2008 |
| JP | 2009223375 | 10/2009 |
| JP | 201040196 | 6/2010 |
| JP | 2010182019 | 8/2010 |
| JP | 2011501279 | 1/2011 |
| JP | 2011501280 | 1/2011 |
| KR | 2007049515 A | 5/2007 |
| WO | WO 2005/081666 | 9/2005 |
| WO | WO 2006/047137 A2 | 5/2006 |
| WO | WO 2009/049556 | 4/2009 |

OTHER PUBLICATIONS

Notification of Transmittal of the International Search Report and the Written Opinion of the International Searching Authority, or the Declaration for PCT/US2010/052892 dated Jun. 28, 2011, 9 pages.

First Office Action in Japanese Patent Application No. 2012-534401, mailed Feb. 10, 2014, 7 pages.

Patent Examination Report No. 1 in Australian Patent Application No. 2010306623, mailed Nov. 6, 2013, 3 pages.

Patent Examination Report No. 2 in Australian Patent Application No. 2010306623, mailed Feb. 13, 2014, 4 pages.

Office Action received for Chinese Patent Application No. 201080056250.7, mailed on May 6 2014, 14 Pages of Chinese Office Action only.

Notice of Allowance received for Japanese Patent Application No. 2012-534401, mailed on Jul. 14, 2014, 2 pages of English Translation and 3 pages of Notice of Allowance.

* cited by examiner

DETECTING AND RESPONDING TO MALWARE USING LINK FILES

BACKGROUND

This specification relates to malware protection software.

Malware is any kind of malicious software such as, for example, a computer virus, Trojan horse, spyware, and malicious active content. Malware can spread via infected email attachments, shared files, or malicious websites. Malware can also spread inconspicuously via link files that cause malicious activities to be performed, such as downloading malware.

Malware can attach to files so when the infected file executes, the malware also execute and, for example, self-replicate without user knowledge or permission. Other malware target a computer's memory and infect files as the computer opens, modifies, or creates files. Some malware can lie dormant and not show any signs of existence, e.g., key capture software, monitoring software, etc.

Malware protection software generally operates by scanning a computer's memory and disk drives for malicious code. Scanning may be performed by comparing signatures of files with signatures of known malware. If the malware protection software lacks updated signatures, however, malicious processes and links may go undetected. Further, links may be used to download new malware for which signatures do not exist, but from locations nevertheless known to be dangerous. In such situations and others, malware protection software fails to prevent damage to the computer system.

SUMMARY

This specification describes technologies relating to detecting and preventing damage from malware based on monitoring link files and the processes that create them.

In general, one innovative aspect of the subject matter described in this specification can be embodied in methods that include the actions of monitoring for a generation of a first file that includes a target path that points to an object; in response to monitoring the generation of the first file: identifying a process that caused the first file to be generated; determining whether the process is a prohibited process; in response to determining that the process is a prohibited process, performing one or more protection processes on the prohibited process and the first file; in response to determining that the process is not a prohibited process, determining whether the target path is a uniform resource locator; in response to determining that the target path is a uniform resource locator, determining whether the uniform resource locator is a prohibited uniform resource locator; in response to determining that the uniform resource locator is a prohibited uniform resource locator, performing one or more protection processes on the first file. Other implementations of this aspect include corresponding systems, apparatus, and computer programs, configured to perform the actions of the methods, encoded on computer-readable storage devices.

Another innovative aspect of the subject matter described in this specification can be embodied in methods that include the actions of monitoring for a generation of a first file that includes a target path that points to an object; in response to monitoring the generation of the first file: determining whether the target path is a uniform resource locator; in response to determining that the target path is a uniform resource locator, identifying a process that caused the first file to be generated; determining whether the process is a prohibited process; in response to determining that the process is a prohibited process, performing one or more protection processes on the process and the first file; in response to determining that the process is not a prohibited process, determining whether the uniform resource locator is a prohibited uniform resource locator; in response to determining that the uniform resource locator is a prohibited uniform resource locator, performing one or more protection processes on the process and the first file. Other implementations of this aspect include corresponding systems, apparatus, and computer programs, configured to perform the actions of the methods, encoded on computer-readable storage devices.

Another innovative aspect of the subject matter described in this specification can be embodied in a computer storage medium encoded with a computer program, the program comprising instructions that when executed by data processing apparatus cause the data processing apparatus to perform operations comprising: monitoring a generation of a first file that generates a request based on a uniform resource locator; in response to monitoring the generation of the first file: identifying a process that caused the first file to be generated; determining whether the process is a prohibited process; in response to determining that the process is a prohibited process, performing one or more protection processes on the process and the first file; in response to determining that the process is not a prohibited process, determining whether the uniform resource locator is a prohibited uniform resource locator; in response to determining that the uniform resource locator is a prohibited uniform resource locator, performing one or more protection processes on the process and the first file.

Particular implementations of the subject matter described in this specification may be implemented so as to realize one or more of the following advantages. Link files generated by computer processes are detected and it is determined whether the link file or the computer process that generated it is malware. Such malware will be prevented from causing damage to the computer system. Link files that target malware but are otherwise generated by non-malware computer processes will also be prevented from causing damage to the computer system.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
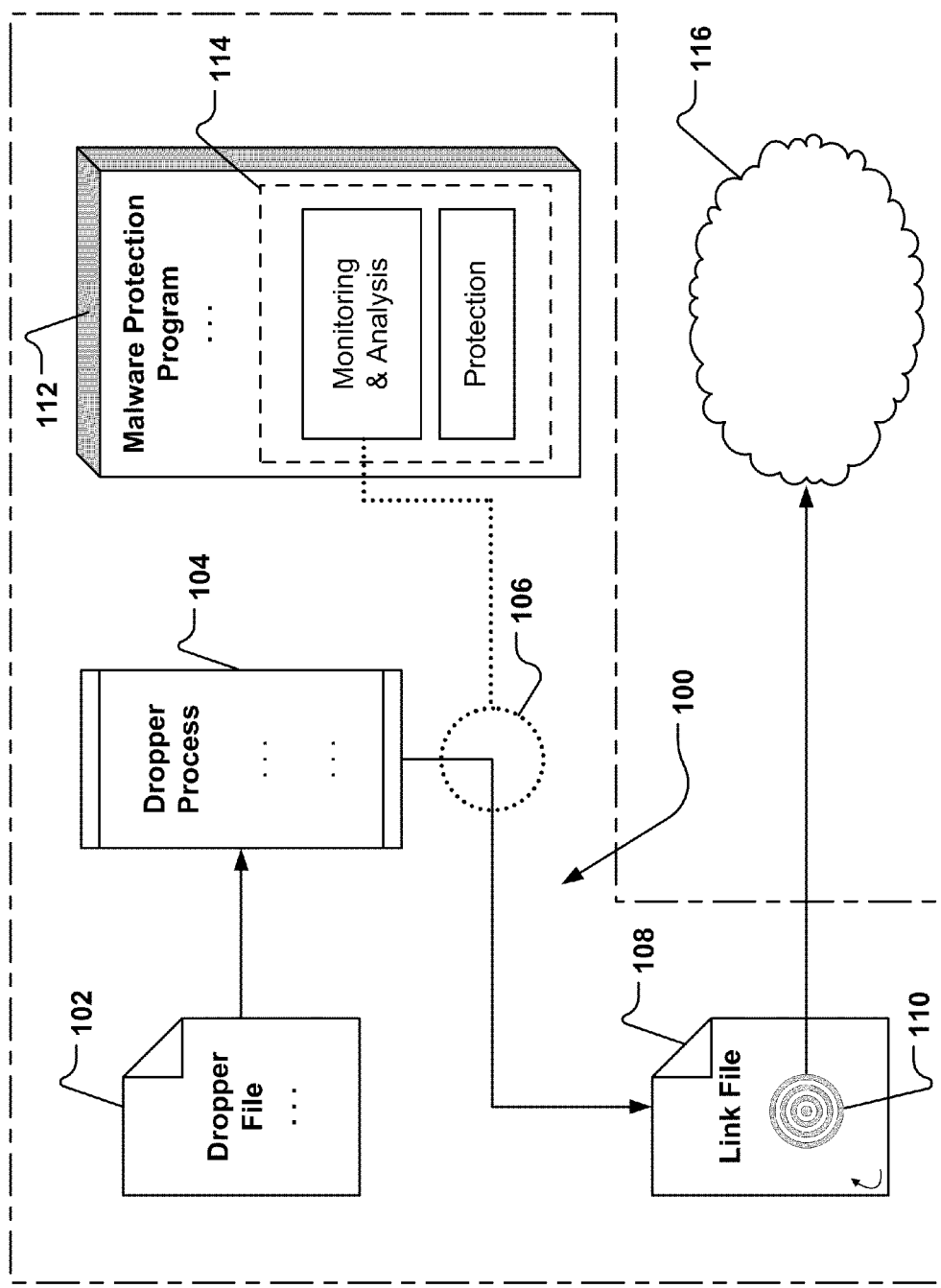
FIG. 1 is a block diagram illustrating an example of a malware protection program that monitors for and responds to the generation of a link file by a computer process.

FIG. 1 is a block diagram illustrating an example of a malware protection program that monitors for and responds to the generation of a link file by a computer process. As used herein, a "malware protection program" is any kind of malware protection software including, for example, antivirus software.

As illustrated in FIG. 1, a dropper process 104 generates a link file 108. The dropper process 104 is a computer process that is an instance of a dropper file 102. A "dropper file," as used herein, is any kind of file or binary code comprising computer-executable instructions that includes instructions for generating another file, such as a link file. A "link file," as used herein, is any kind of file or binary code that contains a target path pointing to another object, or that generates a request to another object when selected, accessed, or instantiated. The target path 110 contained in the link file 108 may be a uniform resource locator (URL). A uniform resource locator identifies the location of a resource, such as a file located on a computer. The resource to which the URL corresponds may be located on a computer that is located on a network 116. The network 116 may be an external network such as the Internet or a local area network on which the computer device 100 is located. Thus, the link file 108 may contain a target path 110 comprising a URL corresponding to a file located on the Internet or on a local network 116 on which the computer device 100 is located. Alternatively, the target path 110 may comprise a URL corresponding to a local file stored on the computer device 100.

As further illustrated in FIG. 1, a malware protection program 112 contains a monitoring and protection module 114. The monitoring and protection module 114 monitors 106 for the generation of a link file 108. The monitoring and protection module 114 can be embodied in software code and, for example, form part of the malware protection program or run independently as a separate program with its own processes, services, etc. In response to detecting 106 the generation of a link file 108, the monitoring and protection module 114 collects information on the dropper process 104 and the dropper file 102. This information may include the identity of the dropper process 104, the location of the dropper file 102, and the location of the link file 108.

Figure 2:
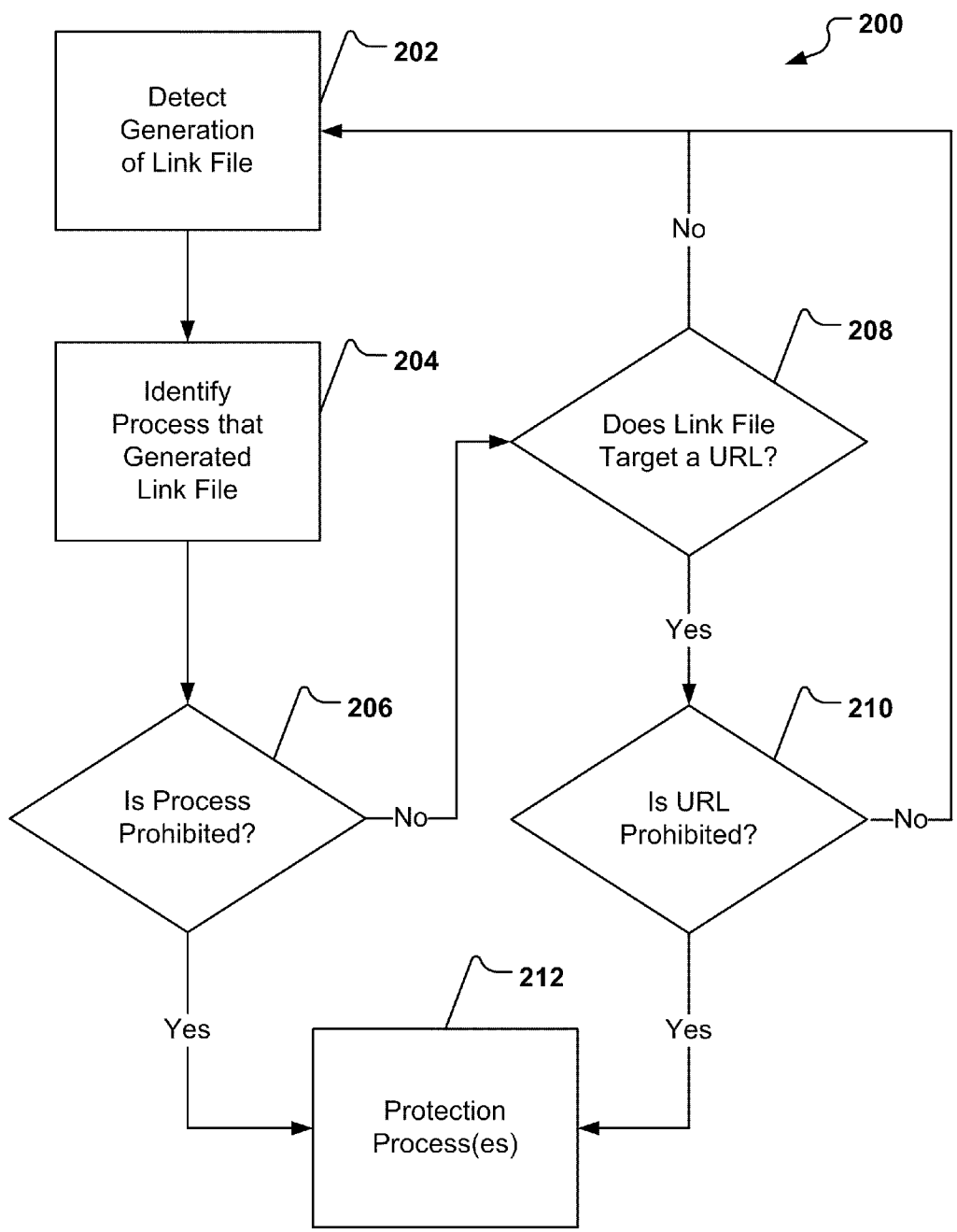
FIG. 2 is a flow diagram illustrating an example process for monitoring and responding to the generation of a link file and performing protection processes.
Figure 3:
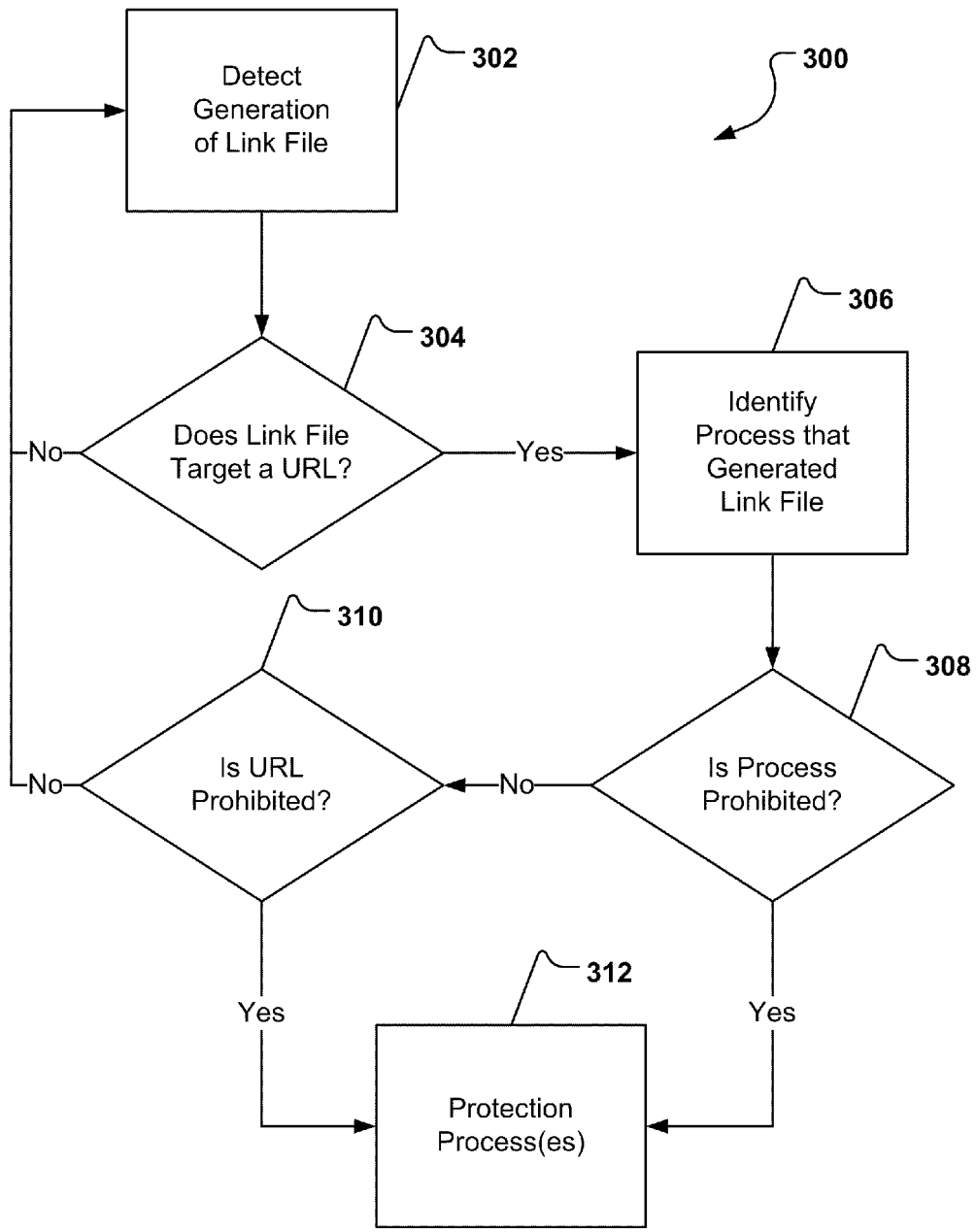
FIG. 3 is a flow diagram illustrating another example process for monitoring and responding to the generation of a link file and performing protection processes.

The monitoring and protection module 114 determines whether the dropper process 104 or the object to which the link file 108 points, or for which the link file generates a request for, is prohibited, as illustrated, by way of example, in FIG. 2 and FIG. 3. The monitoring and protection module 114 determines if the dropper process 104 is prohibited based on data descriptive of the dropper process including, for example, data descriptive of the executable machine code, i.e., the dropper file 102, associated with the dropper process 104. The monitoring and protection module 114 may base the determination on a comparison of the data descriptive of the dropper process and data descriptive of known, prohibited processes or files, as illustrated, by way of example, in FIG. 4.

Additionally, the monitoring and protection module 114 determines if the object to which the link file 108 points, or for which the link file generates a request for, is prohibited based on data descriptive of the object, including, for example, a URL. The monitoring and protection module 114 may base the determination on a comparison of the data descriptive of the object and data descriptive of known, prohibited objects, as illustrated, by way of example, in FIG. 5. Depending on the outcome of these determinations, the monitoring and protection module 114 may terminate the dropper process 104 and perform other protection processes on the dropper file 102 and the link file 108, as further illustrated, by way of example, in FIG. 2 and FIG. 3.

FIG. 2 is a flow diagram illustrating an example process for monitoring and responding to the generation of a link file and performing protection processes. The example process 200 can be implemented in a malware protection program 112, e.g., antivirus software, or embodied in software code that runs independently as a separate program with its own processes, services, etc.

The process 200 detects the generation of a link file (202). For example, the generation of a link file by a computer process can be detected by monitoring for the generation of a file with a ".lnk" extension. In Windows, for example, the process 200 may install "hooks" that intercept Windows API (application programming interface) calls to generate files. When a process generates a file, the process 200 may detect the generation (202) by intercepting the Windows API "CreateFile" call.

The process 200 identifies the process that generated the link file (204). The process 200 may identify the process that generated the link file, as in the example above, by intercepting a Windows API call and collecting information on the process that generated the Windows API call. For example, the process 200 may collect information on the process that generated the "CreateFile" Windows API call, such as that process's ID, name, and file path.

Figure 4:
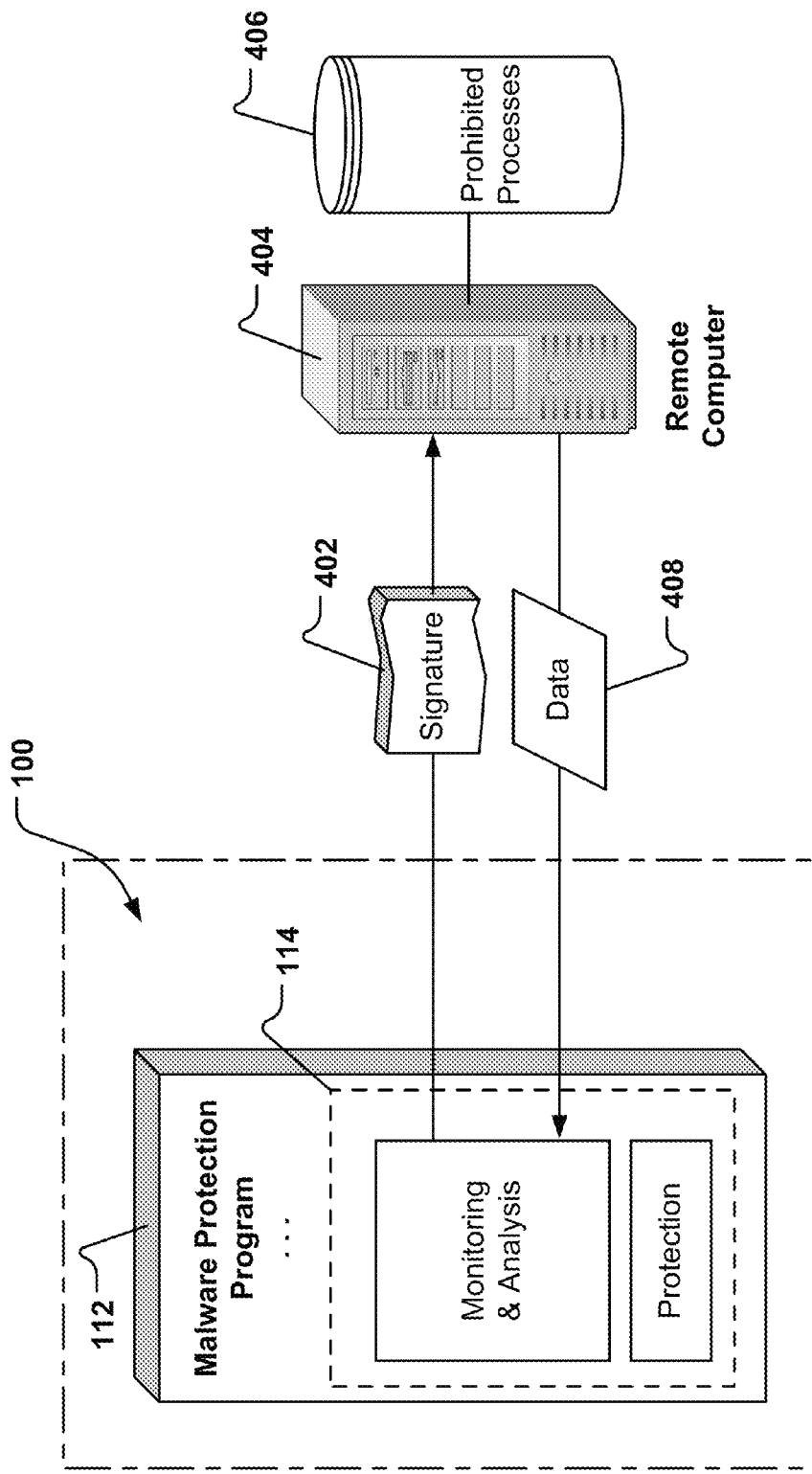
FIG. 4 is a block diagram of an example of a malware protection program in communication with a remote computer for determining whether a computer process that generated a link file is a prohibited process.

The process 200 determines whether the process is a prohibited process (206), as further illustrated, by way of example, in FIG. 4. The process may be identified as a prohibited process based on whether the file from which the process is created is prohibited.

In response to determining that the process is prohibited, one or more protection processes are performed (212) on the process, files associated with the process, and the link file generated by the process. Protection processes can include, for example, terminating the process and deleting, renaming, or quarantining one or more files associated with the process and the link file. Terminating the process may involve terminating the process only or terminating the process and all other processes directly and/or indirectly initiated by the process. Files associated with the process may include the file containing the executable machine code from which the process is instantiated. In addition to deleting this file, and the link file, the files may be renamed such that they become unusable until they are manually cleaned, deleted, or otherwise handled. Quarantining may involve safely isolating and neutralizing the file from which the process is instantiated and the link file until future action can be taken. One example of quarantining can involve encrypting a file, renaming it, and moving it to a quarantine directory or folder.

Alternatively, if it is determined that the process is not prohibited, a determination is made as to whether the link file targets a target URL (208). The process 200 determines if the link file targets a target URL by, for example, parsing the link file and searching for text strings or code indicative of a URL. A text string indicative of a URL, for example, may begin with "http://."

In another implementation, if it is determined that the process is not prohibited, a determination is made as to whether the link file generates a request to a URL or based on a URL. For example, the file can be parsed as described above, or the file can be selected, accessed, or instantiated, e.g., executed, in a protected emulation space to determine whether the link file generates a request to a URL or based on a URL.

Figure 5:
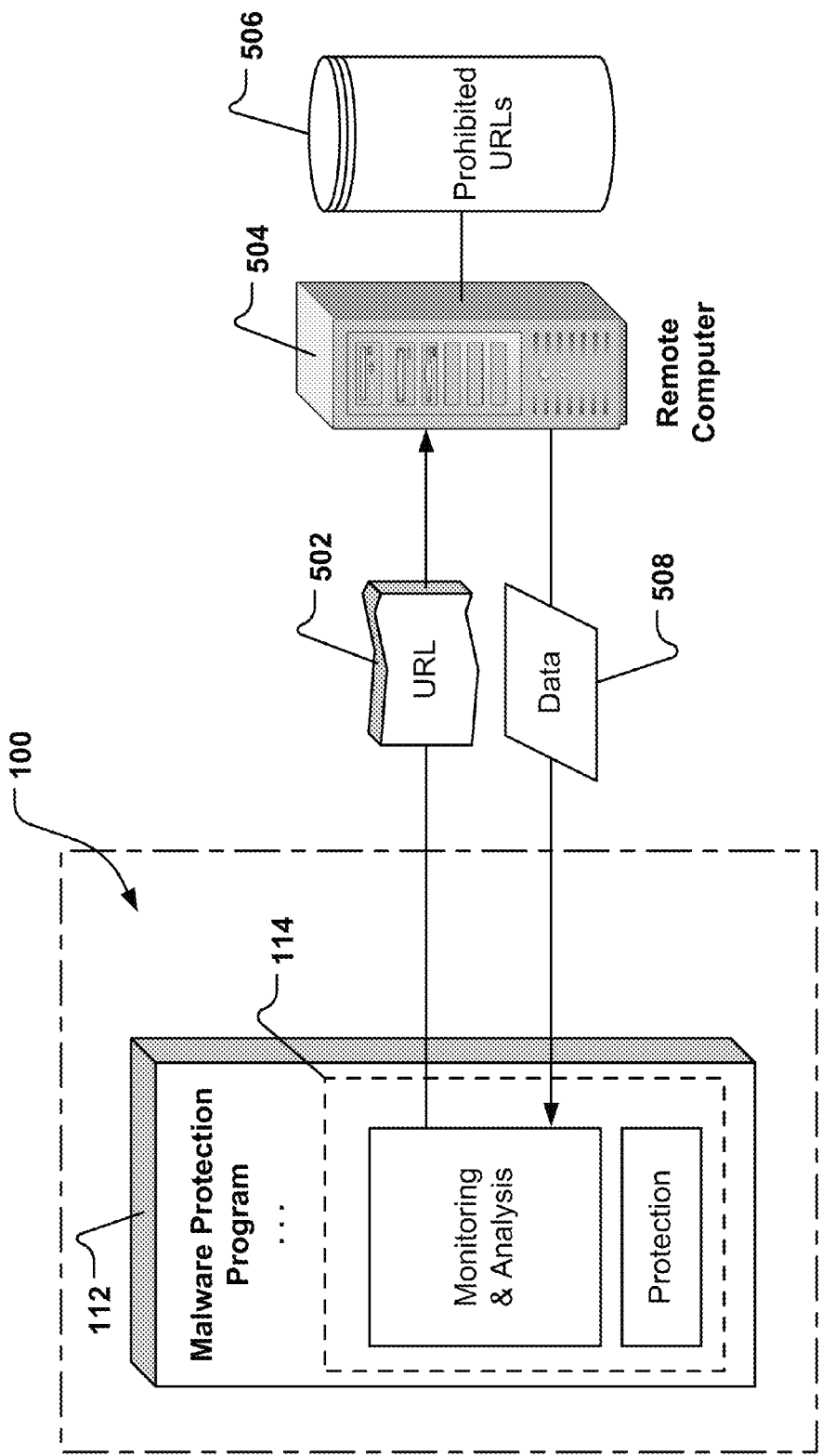
FIG. 5 is a block diagram of an example of a malware protection program in communication with a remote computer for determining whether an object to which a link file points is a prohibited object.

In response to determining that the link file contains a target URL, the process 200 determines whether the URL is prohibited or references a prohibited object (210), as further illustrated, by way of example, in FIG. 5. The URL may be prohibited if, for example, the URL addresses a malicious website or file. If the process 200 determines that the URL is prohibited or references a prohibited object, one or more protection processes are performed (212), as described above.

FIG. 3 is a flow diagram illustrating another example process for monitoring and responding to the generation of a link file and performing protection processes. The example process 300 can be implemented in a malware protection program 112, e.g., antivirus software, or embodied in software code that runs independently as a separate program with its own processes, services, etc.

The process 300 detects the generation of a link file (302). The generation of a link file can be detected, as in the example above, by monitoring for the generation of a file with a ".lnk" extension, or by monitoring for the location of a file that generates a request to a URL or a request based on a URL. In response to detecting the generation of a link file (302), the process 300 determines whether the link file includes a target URL (304). In response to determining that the link file includes a target URL, the process 300 identifies the process that generated the link file (306). The process 300 may identify the process that generated the link file, as in the example above, by intercepting a "CreateFile" Windows API call and collecting information on the process that generated the Windows API call.

The process 300 determines whether the process is a prohibited process (308), as further illustrated, by way of example, in FIG. 4. The process may be identified as a prohibited process based on whether the file from which the process is created is prohibited. If the process 300 determines that the process is prohibited, one or more protection processes are performed on the process and the link file. Protection processes performed on the process that generated the link file can include, for example, terminating the process and deleting, renaming, and quarantining the file from which the process is instantiated and one or more other files associated with the process. Protection processes performed on the link file can include, for example, deleting, renaming, and quarantining the link file.

If the process 300 determines that the process is not prohibited, the process 300 determines whether the URL is prohibited or references a prohibited object (310), as further illustrated, by way of example, in FIG. 5. If the process 300 determines that the URL is prohibited or references a prohibited object, one or more protection processes are performed (312) on the process that generated the link file and the link file.

FIG. 4 is a block diagram of an example of a malware protection program in communication with a remote computer for determining whether a computer process that generated a link file is a prohibited process. The determination can be made by a program executed on a computer device 100, such as a malware protection program 112. For example, the monitoring and protection module 114 may identify a process that generated a link file, generate and send data descriptive of the process to a remote computer, and receive data indicative of whether the process is prohibited.

In this example implementation, the data 402 descriptive of the process is sent to a remote computer 404 that contains a database or other stored compilation of data descriptive of prohibited processes 406. The remote computer 404 may be maintained by the provider of the malware protection program. The remote computer 404 returns data 408 indicative of whether the process is a prohibited process. The monitoring and protection module 114 determines whether the process is a prohibited process based on the data 408 received by the remote computer 404.

A signature 402 is one example of data descriptive of the process in accordance with one example implementation of the present invention. A signature is a data pattern—often a simple string of characters or bytes—that can be used to identify a particular file, process, or other electronic data. Examples of signatures include hashes of a file or hashes of portions of the file. Malware protection programs can use signatures, for example, to detect and locate specific malware such as viruses, or otherwise identify services, processes, or files.

As illustrated in FIG. 4, the signature 402 descriptive of the process is generated by the monitoring and protection module 114 and sent to the remote computer 404. The remote computer 404 compares the received signature 402 to data descriptive of prohibited processes contained in the database or other stored compilation 406 and returns data 408 indicative of whether the process is a prohibited process. Data descriptive of prohibited processes contained in the database or other stored compilation may include signatures of prohibited files. Based on the received data 408, a determination is made by the monitoring and protection module 114 as to whether the process that generated the link file is a prohibited process.

The signature 402 is one example of data descriptive of the process that generated the link file. Other data can be generated and used to make the determination of whether the process is a prohibited process, including even a complete data copy of the one or more files associated with the process, e.g., the executable machine code associated with the process such as the file from which the process is instantiated.

In other implementations, the database or other stored compilation of data descriptive of approved processes 406 can be stored locally on the computer device 100 on which the process and malware protection program are running That is, the signature 402 can be generated and compared to a locally stored database or other locally stored compilation of signatures of prohibited processes such as known malware.

FIG. 5 is a block diagram of an example of a malware protection program in communication with a remote computer for determining whether an object to which a link file points is a prohibited object. The determination can be made by a program executed on a computer device 100, such as a malware protection program 112. For example, the monitoring and protection module 114 may identify a link file that has been generated, generate and send data descriptive of the link file's target object to a remote computer, and receive data indicative of whether the object is prohibited.

In this example implementation, the data 502 descriptive of the process is sent to a remote computer 504 that contains a database or other stored compilation of data descriptive of prohibited objects 506. The remote computer 504 may be maintained by the provider of the malware protection program. The remote computer 504 returns data 508 indicative of whether the object is a prohibited object. A determination is made as to whether the object is a prohibited process based on the data 508 received by the remote computer 504.

A URL 502 is one example of data descriptive of the object in accordance with one example implementation of the present invention. As illustrated in FIG. 5, the URL 502 is sent by the monitoring and protection module 114 to the remote computer 504. The remote computer 504 compares the received URL 502 to data descriptive of prohibited objects contained in the database or other stored compilation 506 and returns data 508 indicative of whether the object is a prohibited object. Data descriptive of prohibited objects contained in the database or other stored compilation may include URLs. Based on the received data 508, a determination is made by the monitoring and protection module 114 as to whether the object targeted by the link file is prohibited.

In other implementations, the database or other stored compilation of data descriptive of approved processes 506 can be stored locally on the computer device 100 on which the process that generated the link file and malware protection program are running That is, the URL 502 can be compared to a locally stored database or other locally stored compilation of prohibited URLs.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) embodying the processes and logic flows described in this specification can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, such as user prompt 19 illustrated in FIG. 6, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
monitoring, by a first computer, a generation of a link file that includes a target path that points to an object;
in response to monitoring the generation of the link file:
identifying, by the first computer, a process that caused the link file to be generated;
determining, by the first computer, whether the process is a prohibited process;
in response to determining that the process is a prohibited process, performing, by the first computer, one or more protection processes on the process and the link file;
in response to determining that the process is not a prohibited process, determining, by the first computer, whether the link file generates a request to a uniform resource locator;
in response to determining that the link file generates a request to a uniform resource locator, determining, by the first computer, whether the uniform resource locator is associated with a malicious resource;
in response to determining that the uniform resource locator is associated with a malicious resource, performing, by the first computer, one or more protection processes on the link file.

2. The computer-implemented method of claim 1, wherein determining, by the first computer, whether the process is a prohibited process comprises:
generating, by the first computer, data descriptive of the process;
sending, by the first computer, the data descriptive of the process to a second computer;
receiving, by the first computer, data indicative of whether the process is a prohibited process from the second computer; and
determining, by the first computer, in response to the data received from the second computer, whether the process is a prohibited process.

3. The computer-implemented method of claim 2, wherein the data descriptive of the process comprises a signature associated with the first process.

4. The computer-implemented method of claim 1, wherein determining, by the first computer, whether the uniform resource locator is associated with a malicious resource comprises:
generating, by the first computer, data descriptive of the uniform resource locator;
sending, by the first computer, the data descriptive of the uniform resource locator to a second computer;
receiving, by the first computer, data indicative of whether the uniform resource locator is associated with a malicious resource from the second computer; and
determining, by the first computer, in response to the data received from the second computer, whether the uniform resource locator is associated with a malicious resource.

5. The computer-implemented method of claim 1, wherein the one or more protection processes performed on the process comprise one or more of the following:
terminating, by the first computer, the process;
deleting, by the first computer, one or more files associated with the process;
renaming, by the first computer, one or more files associated with the process;
quarantining, by the first computer, one or more files associated with the process; and
sending, by the first computer, one or more files associated with the process to a second computer for analysis.

6. The computer-implemented method of claim 1, wherein the one or more protection processes performed on the link file comprise one or more of the following:
deleting, by the first computer, one or more files associated with the link file;
renaming, by the first computer, one or more files associated with the link file; and
quarantining, by the first computer, one or more files associated with the link file.

7. The method of claim 1, wherein determining whether the uniform resource locator is associated with a malicious resource includes determining whether the uniform resource locator references a malicious object.

8. The method of claim 1, wherein determining whether the uniform resource locator is associated with a malicious resource includes determining whether the uniform resource locator addresses a malicious resource.

9. A computer-implemented method, comprising:
monitoring, by a first computer, a generation of a link file that includes a target path that points to an object;

in response to monitoring the generation of the link file:
> determining, by the first computer, whether the link file generates a request to a uniform resource locator;
> in response to determining that the link file generates a request to a uniform resource locator, identifying, by the first computer, a process that caused the link file to be generated;
> determining, by the first computer, whether the process is a prohibited process;
> in response to determining that the process is a prohibited process, performing, by the first computer, one or more protection processes on the process and the link file;
> in response to determining that the process is not a prohibited process, determining, by the first computer, whether the uniform resource locator is associated with a malicious resource;
> in response to determining that the uniform resource locator is associated with a malicious resource, performing, by the first computer, one or more protection processes on the process and the link file.

10. The computer-implemented method of claim 9, wherein determining, by the first computer, whether the process is a prohibited process comprises:
> generating, by the first computer, data descriptive of the process;
> sending, by the first computer, the data descriptive of the process to a second computer;
> receiving, by the first computer, data indicative of whether the process is a prohibited process from the second computer; and
> determining, by the first computer, in response to the data received from the second computer, whether the process is a prohibited process.

11. The computer-implemented method of claim 10, wherein the data descriptive of the process comprises a signature associated with the process.

12. The computer-implemented method of claim 9 wherein determining, by the first computer, whether the uniform resource locator is associated with a malicious resource comprises:
> generating, by the first computer, data descriptive of the uniform resource locator;
> sending, by the first computer, the data descriptive of the uniform resource locator to a second computer;
> receiving, by the first computer, data indicative of whether the uniform resource locator is associated with a malicious resource from the second computer; and
> determining, by the first computer, in response to the data received from the second computer, whether the uniform resource locator is associated with a malicious resource.

13. The computer-implemented method of claim 9, wherein the one or more protection processes performed on the process comprise one or more of the following:
> terminating, by the first computer, the process;
> deleting, by the first computer, one or more files associated with the process;
> renaming, by the first computer, one or more files associated with the process;
> quarantining, by the first computer, one or more files associated with the process; and
> sending, by the first computer, one or more files associated with the process to a second computer for analysis.

14. The computer-implemented method of claim 9, wherein the one or more protection processes performed on the link file comprise one or more of the following:
> deleting, by the first computer, one or more files associated with the link file;
> renaming, by the first computer, one or more files associated with the link file; and
> quarantining, by the first computer, one or more files associated with the link file.

15. A computer storage medium encoded with a computer program, the program comprising instructions that when executed by at least one data processing apparatus cause the at least one data processing apparatus to perform operations comprising:
> monitoring a generation of a link file that generates a request to a uniform resource locator;
> in response to monitoring the generation of the link file:
> > identifying a process that caused the link file to be generated;
> > determining whether the process is a prohibited process;
> > in response to determining that the process is a prohibited process, performing one or more protection processes on the process and the link file;
> > in response to determining that the process is not a prohibited process, determining whether the uniform resource locator is associated with a malicious resource;
> > in response to determining that the uniform resource locator is associated with a malicious resource, performing one or more protection processes on the process and the link file.

16. The computer storage medium of claim 15, wherein determining whether the process is a prohibited process, further comprises:
> generating data descriptive of the process;
> sending the data descriptive of the process to a second computer;
> receiving data indicative of whether the process is a prohibited process from the second computer; and
> determining, in response to the data received from the second computer, whether the process is a prohibited process.

17. The computer storage medium of claim 16, wherein the data descriptive of the process comprises a signature associated with the process.

18. The computer storage medium of claim 15, wherein determining whether the uniform resource locator is associated with a malicious resource further comprises:
> generating data descriptive of the uniform resource locator;
> sending the data descriptive of the uniform resource locator to a second computer;
> receiving data indicative of whether the uniform resource locator is associated with a malicious resource from the second computer; and
> determining, in response to the data received from the second computer, whether the uniform resource locator is associated with a malicious resource.

19. The computer storage medium of claim 15, wherein the one or more protection processes performed on the process comprise one or more of the following:
> terminating the process;
> deleting one or more files associated with the process;
> renaming one or more files associated with the process;
> quarantining one or more files associated with the process; and
> sending one or more files associated with the process to a second computer for analysis.

20. The computer storage medium of claim 15, wherein the one or more protection processes performed on the link file comprise one or more of the following:

deleting one or more files associated with the link file;
renaming one or more files associated with the link file; and
quarantining one or more files associated with the link file.

\* \* \* \* \*